United States Patent [19]

Epperly et al.

[11] Patent Number: 5,047,219
[45] Date of Patent: Sep. 10, 1991

[54] HYBRID PROCESS FOR NITROGEN OXIDES REDUCTION

[75] Inventors: W. Robert Epperly, New Canaan; Barry N. Sprague, Bethlehem, both of Conn.

[73] Assignee: Fuel Tech, Inc., Rowayton, Conn.

[21] Appl. No.: 395,810

[22] Filed: Aug. 18, 1989

[51] Int. Cl.$^5$ .............................................. C01B 21/00
[52] U.S. Cl. ................................................... 423/235
[58] Field of Search ........................... 423/235, 235 D

[56] References Cited

U.S. PATENT DOCUMENTS

| 4,276,276 | 6/1981 | Van Hook et al. ................. 423/235 |
| 4,350,669 | 9/1982 | Izumi et al. . | |
| 4,777,024 | 10/1988 | Epperly et al. . | |
| 4,780,289 | 10/1988 | Epperly et al. . | |
| 4,783,325 | 11/1988 | Jones .................................. 423/235 |
| 4,830,839 | 5/1989 | Epperly et al. . | |

FOREIGN PATENT DOCUMENTS 8907004  2/1988  PCT Int'l Appl. .

*Primary Examiner*—Gregory A. Heller
*Attorney, Agent, or Firm*—St. Onge Steward Johnston & Reens

[57] ABSTRACT

The invention presented is a process for reducing the nitrogen oxides concentration in the effluent from the combustion of a carbonaceous fuel. The inventive process comprises introducing into the effluent an oxygenated treatment agent which includes an oxygenated hydrocarbon under conditions effective to oxidize nitric oxide in the effluent to nitrogen dioxide and to produce ammonia; and contacting the effluent with an aqueous absorbing solution having a component capable of causing nitrogen dioxide to be absorbed into the solution.

15 Claims, 1 Drawing Sheet

HYBRID PROCESS FOR NITROGEN OXIDES REDUCTION

TECHNICAL FIELD

The present invention relates to a process for reducing the nitrogen oxides ($NO_x$) concentration in the effluent from the combustion of a carbonaceous fuel, wherein the process utilizes a hybrid of two different processes thusly utilizing the advantages and eliminating the disadvantages of each.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used in suspension fired boilers such as large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. $NO_x$ also arises from the oxidation of nitrogen containing species in the fuel, such as is found in heavy fuel oils and coal, and can form even in circulating fluidized bed boilers which operate at temperatures which typically range from 1300° F. to 1700° F.

Nitrogen oxides are troublesome pollutants which are found in the combustion effluent streams of boilers when fired as described above, and comprise a major irritant in smog. It is further believed that nitrogen oxides can undergo a process known as photochemical smog formation, through a series of reactions in the presence of sunlight and hydrocarbons. Moreover, nitrogen oxides comprise a significant contributor to acid rain.

Efforts have long been underway to develop selective noncatalytic nitrogen oxides reduction processes because of the efficiency and economy of such processes. Noncatalytic processes often have the drawback, though, of producing ammonia as an unwanted secondary pollutant which exits the boiler with the effluent. Also under extensive development in recent years have been "scrubbing" processes for reducing nitrogen oxides. Since many large utility boilers already have in place the extensive equipment needed for scrubbing sulfur dioxides from the effluent, it has long been desired that these apparatus also be used to scrub $NO_x$ from the effluent. Scrubbing processes, though, have the drawback that they are generally only effective at scrubbing nitrogen dioxide, whereas nitric oxide is the predominant species of $NO_x$ present in most combustion effluents. Also disadvantages is the fact that absorbed nitrogen dioxides are present in the scrubbing solution as nitrites ($NO_2^-$), which are then discharged with the solution into, for instance, rivers or streams.

BACKGROUND ART

As noted, processes and compositions for the reduction of nitrogen oxides in effluents from the combustion of carbonaceous fuels have been developed extensively over recent years. With the increased attention to the health risks and environmental damage caused by agents such as smog and acid rain, it is expected that $NO_x$ reduction research will continue to be pursued.

In the past, most processes for reducing nitrogen oxides levels have concentrated on achieving maximum $NO_x$ reductions without addressing the problems raised by the production of other pollutants, such as ammonia and carbon monoxide. More recently, in a unique application of nitrogen oxides reducing principles, Epperly, Peter-Hoblyn, Shulof, Jr., and Sullivan, in U.S. Pat. No. 4,777,024, disclose a method of achieving substantial nitrogen oxides reductions without the production of a major amount of other pollutants through a multiple stage treatment agent injection process. Although minimizing the production of other pollutants, this process, like any process which involves the high temperature introduction of nitrogenated compounds such as urea or ammonia, will still generate some other pollutants.

This is also the case with the method of U.S. Pat. No. 4,780,289, issued to Epperly, O'Leary and Sullivan, which discloses another method for maximizing $NO_x$ reductions while minimizing other pollutants. Although minimized, such other pollutants are still present.

In Izumi et al., U.S. Pat. No. 4,350,669, the patentees disclose a process for reducing nitrogen oxides in combustion exhaust gases which comprises adding an oxygen-containing hydrocarbon and/or its precursor to the exhaust gas to oxidize nitric oxide to nitrogen dioxide, which can then be scrubbed out of the effluent using an absorbing solution. The process of Izumi et al., though, still has the disadvantage of allowing nitrites and nitrates to be discharged from the boiler with the discharge water.

What is needed, therefore, is a process for effectively reducing the nitrogen oxides concentration in an effluent which does not cause the release into the atmosphere of substantial amounts of ammonia nor the discharge in the discharge water of substantial amounts of nitrites.

DISCLOSURE OF INVENTION

The present invention comprises a process for reducing the nitrogen oxides in a combustion effluent by a multi-part process which does not lead to the release of substantial amounts of ammonia to the atmosphere nor the discharge of substantial amounts of nitrites.

Primarily, the inventive process comprises introducing into the effluent a treatment agent which preferably comprises an oxygenated hydrocarbon under conditions effective to oxidize nitric oxide (NO) in the effluent to nitrogen dioxide ($NO_2$) while also ensuring that the effluent comprises ammonia. Next, the process comprises contacting the effluent with a scrubbing medium which comprises a component capable of causing nitrogen dioxide to be absorbed into the solution.

By practice of this process, the nitrogen oxides concentration in the effluent is substantially reduced without the discharge of either substantial amounts of ammonia or substantial amounts of nitrites.

BRIEF DESCRIPTION OF THE DRAWINGS

These and other objects will be described and the present invention better understood and its advantages more apparent in view of the following detailed description, especially when read with reference to the appended drawings, wherein.

BEST MODE FOR CARRYING OUT THE INVENTION

Figure 1:
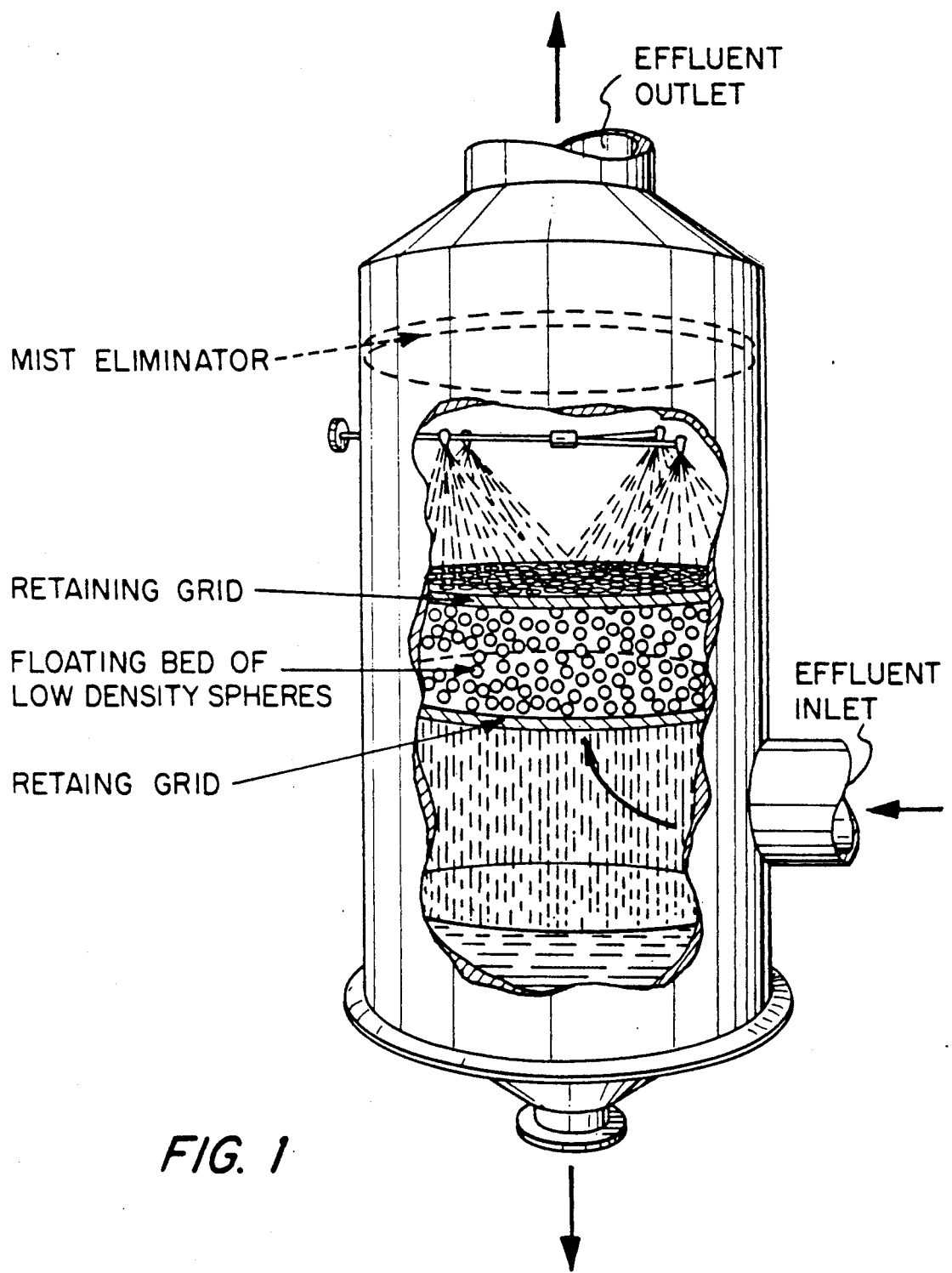
FIG. 1 is a partially broken away side plan view of a scrubber useful in the process of the present invention.

In the process of the present invention, an oxygenated treatment agent is introduced into the effluent from the combustion of a carbonaceous fuel. The oxygenated treatment agent to be introduced, as noted above, preferably comprises an oxygenated hydrocarbon. By "oxygenated hydrocarbon" is meant a hydrocarbon which contains oxygen or an oxygen-containing group. For the purposes of this invention, the term oxygenated hydrocarbon is also meant to include precursors of oxygenated hydrocarbons namely hydrocarbons which can be oxidized in an oxygen- containing environment; for instance, methane would be considered a precursor for methanol. The oxygenated treatment agent functions to oxidize the nitric oxide which remains in the effluent after treatment with the first treatment agent to nitrogen dioxide. As would be familiar to the skilled artisan, in the combustion of a carbonaceous fuel the predominant nitrogen oxides species is NO, which cannot be absorbed by most known absorbing solutions. Accordingly, the remaining NO has to be oxidized to $NO_2$ before it can be absorbed. By the introduction of an oxygenated hydrocarbon, a significant portion of the nitric oxide is oxidized to nitrogen dioxide. The oxygenated treatment agent is introduced into the effluent at an effluent temperature effective for the oxidation of NO to $NO_2$. Preferably, it is introduced at a temperature of about 500° F. to about 1600° F., more preferably about 800° F. to about 1200° F.

Most advantageously, the oxygenated treatment agent comprises an alcohol having the formula ROH, wherein R is any suitable straight or branched chain, cyclic or heterocyclic, hydrocarbon which is substituted or unsubstituted as desired. Preferred among alcohols is methanol, ethylene glycol and propylene glycol, although other alcohols can also be utilized. The oxygenated treatment agent of this invention can also comprise a carbohydrate, such as sugar or molasses, and a heterocyclic hydrocarbon having at least one cyclic oxygen, such as furfural and furfural derivatives, and mixtures of the above.

For the purposes of this description, the term "sugar" refers to any useful sacchardie or carbohydrate material or mixture thereof which is capable of decreasing the $NO_x$ concentration in an effluent under conditions as described herein, including non-reducing and reducing water soluble mono-saccharides and the reducing and non-reducing polysaccharides and their degradation products, such as pentoses including aldopentoses, methyl pentoses, keptopentoses like xylose and arabinose, deoxyaldoses like rhaminose, hexoses and reducing sacchardies such as aldo hexoses like glucose, galactose and mannose, ketohexoses like fructose and sorbose, disaccharides like lactose and maltose, non-reducing disaccharides like sucrose and other polysaccharides such as dextrin and raffinose, hydrolyzed starches which contain as their constituents oligosaccharides, water dispersible polysaccharides and water soluble or dispersible cellulosic materials such as cellulose acetate; the term "heterocyclic hydrocarbon having at least one cyclic oxygen" as used in this description refers to a ringed hydrocarbon compound having at least one ring oxygen; and the term "furfural" as used in this description is meant to include furfural itself as well as substituted furfural. Typical substituents include side chains comprising straight and branched-chain, substituted and unsubstituted aliphatic groups, oxygenated hydrocarbon groups and amino groups. Preferred substituted furfural compounds include hydroxymethyl furfural and furfural acetone.

In order for the oxygenated treatment agent to effectively oxidize nitric oxide to nitrogen dioxide, the effluent at the point of introduction of the oxygenated hydrocarbon must be "oxygen-rich," by which is meant the effluent must contain a stoichiometric excess of oxygen. Although this stoichiometric excess can be provided by introducing oxygen with or immediately prior to introduction of the oxygenated treatment agent, most commonly the excess of oxygen will be provided by the combustion process. Advantageously, the effluent contains an excess of oxygen ranging from about 1% to about 15% by volume.

Generally, the oxygenated treatment agent is introduced into the effluent at a weight ratio of treatment agent to the baseline nitrogen oxides level in the effluent of about 1:5 to about 5:1 in order to have sufficient oxygenated hydrocarbon present to oxidize the nitric oxide in the effluent to nitrogen dioxide. By "baseline nitrogen oxides level" is meant the level (measured or calculated) of nitrogen oxides in the effluent prior to introduction of the treatment agent. Such a baseline $NO_x$ level can also be used in calculating the percentage of nitrogen oxides reduced by measuring the level of nitrogen oxides in the effluent after treatment, dividing that number by the baseline nitrogen oxides level, subtracting from unity and multiplying by 100 to give the $NO_x$ reduction expressed as percentage of baseline. In the situation where a first treatment agent is introduced prior to the oxygenated treatment agent, as discussed in more detail below, the oxygenated treatment agent is introduced at a weight ratio to the $NO_x$ levels existing after introduction of such first treatment agent, instead of the baseline level.

Although the exact mechanism by which the oxidation reaction occurs is not known, it is believed to occur the following series of formulae:

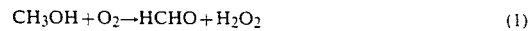

$$CH_3OH + O_2 \rightarrow HCHO + H_2O_2 \tag{1}$$

$$HCHO + O_2 \rightarrow HCOOH + O^* \tag{2}$$

$$HCOOH + O_2 \rightarrow H_2O_2 + CO_2 \tag{3}$$

$$H_2O_2 + NO \rightarrow NO_2 + H_2O \tag{4}$$

$$O^* + NO \rightarrow NO_2 \tag{5}$$

As will be discussed in more detail below, it is important that after introduction of the oxygenated treatment agent the effluent contains ammonia in the molar ratio of ammonia to nitrogen dioxide in the effluent of about 1:5 to about 5:1, especially about 1:2 to about 2:1. In this way, sufficient ammonia will be present in the effluent to be absorbed by the scrubbing medium in order to combine with and minimize the concentration of nitrites and nitrates in the scrubbing medium, yet there will not be so much ammonia that a substantial amount will be discharged either in the discharge water or with the effluent.

The presence of the proper amount of ammonia can be ensured by varying the effluent temperature (by, for instance, adjusting the location at which the introduction occurs), the specific chemical composition and/or the introduction ratio of the oxygenated treatment agent. The composition, molar ratio and/or temperature at which the oxygenated treatment agent is introduced should be adjusted so that the molar ratio of ammonia to nitrogen dioxide in the treated effluent is about 1:5 to about 5:1, especially about 1:2 to about 2:1. This can be accomplished, for instance, by utilizing the process of U.S. Pat. No. 4,780,289, which utilizes the nitrogen oxides reduction versus effluent temperature curve of a treatment agent to control the presence of secondary pollutants such as $NH_3$ while reducing $NO_x$, or in addition, according to the technology and practices detailed in U.S. Pat. No. 4,830,839 to Epperly, Peter-Hoblyn and Sullivan, which also advantageously utilizes a treatment agent's $NO_x$ reduction versus effluent temperature curve. The disclosures of each of these patents are incorporated herein by reference.

The introduction temperature of a treatment agent has predictable effects on both nitrogen oxides reductions achieved and on the amount of ammonia remaining in the effluent after introduction of the treatment agent. With knowledge of this information, the nature and introduction of the oxygenated treatment agent can be carefully coordinated to produce the desired amount of ammonia in the effluent even where the choice of introduction temperatures cannot be altered (in many boilers, retrofitting or providing access for different injection levels is not always possible or economically feasible). Typically, this involves introducing a treatment agent such that it is acting on the "left" side of the plateau of its nitrogen oxides reduction versus effluent temperature curve at the effluent temperature at the point of introduction, in order to generate sufficient ammonia for the scrubbing aspect of the process.

Advantageously, besides oxidizing NO to $NO_2$ and ensuring the presence of ammonia, the oxygenated treatment agent can also be introduced in a manner so as to reduce $NO_x$ to $N_2$. This can be accomplished, for instance, by utilizing treatment agents and according to processes disclosed in U.S. Pat. No. 4,888,165; U.S. Pat. No. 4,877,591; U.S. Pat. No. 4,803,059; U.S. Pat. No. 4,844,878; International Patent Application entitled "Composition for Introduction into a High Temperature Environment" having Application Number PCT/US89/0711, filed in the names of Epperly, Sprague and von Harpe on Apr. 28, 1989; copending and commonly assigned U.S. Pat. Application entitled "Process for Reducing Nitrogen Oxides in an Effluent Using a Hydrocarbon or Hydrogen Peroxide" having Serial Number 07/319,862, filed in the name of Sullivan on Mar. 3, 1989; U.S. Pat. No. 4,902,488; U.S. Pat. No. 4,837,066. The disclosures of each of these patents and applications are incorporated herein by reference.

After treatment with the oxygenated treatment agent, the effluent is then passed through a scrubber and treated with a scrubbing medium. The scrubber used can be any commonly known and installed in utility boilers and, in fact, advantageously, can be any of those commonly used for sulfur dioxide scrubbing. A typical scrubbing apparatus is illustrated in FIG. 1.

The scrubbing medium utilized should comprise water, at least partially, since it is the aqueous nature of the medium which causes absorption thereinto of nitrogen dioxide in the effluent. Preferably, the scrubbing medium has a pH of 12 or lower, more preferably 7 or lower in order to favor the formation of $NH_4^+$, as will be discussed in more detail below, and to facilitate the reaction between $NH_4^+$ and $NO_2^-$ to form $N_2$, as will also be discussed in more detail below. Compositions which can be used as scrubbing media include water, sea water and calcium hydroxide or sodium hydroxide solutions. The solids concentration of the latter two solutions can range from about 0.1% to about 10.0% by weight.

Compositions which can be added to the scrubbing media to maintain the desired pH are acids such as sulfuric acid and buffering agents, such as carboxylic acids and salts like ammonium sulfate, calcium carbonate, sodium carbonate, calcium acetate, sodium citrate and sodium formate. These compositions can be added to the scrubbing solution or can be formed in situ from acid components (such as $SO_3$ or $CO_2$) present in the effluent which are absorbed by the solution or by addition of the free carboxylic acid to the solution. Generally, the composition is present in the scrubbing media in an amount of about 200 parts per million (ppm) to about 5000 ppm, more preferably, about 750 ppm to about 2500 ppm. Most preferably, the composition is present in an amount of about 800 ppm to about 1500 ppm. Most advantageously, the aqueous absorbing solution is at a temperature of about 50° F. to about 300° F., especially about 150° F. to about 200° F.

Upon absorption into the scrubbing solution in the scrubber, the nitrogen dioxide is, to a great extent, converted to nitrite ($NO_2^-$). The ammonia present in the effluent is also absorbed by the scrubbing medium due to the aqueous nature of the scrubbing medium. Once in solution, ammonia is converted to ammonium ions ($NH_4^+$) according to the following formula:

$$NH_3 + H^+ \rightarrow NH_4^+$$

Although the reaction to form the ammonium ion is an equilibrium reaction, it is highly favored at acidic pH's so that, at pH below 7, the reaction produces virtually 100% ammonium ion. In solution, the ammonium ion combines with the nitrite present according to the following formula:

$$NO_2^- + NH_4^+ \rightarrow N_2 + H_2O$$

In this way, the nitrite concentration is reduced in the scrubbing medium, which can then be discharged into the environment.

If desired, a first treatment agent, which comprises a nitrogenous composition, by which is meant a composition having at least one component containing as an element thereof nitrogen, can be introduced into the effluent prior to introduction of the oxygenated treatment agent. The reduction of nitrogen oxides by such treatment agents comprises a selective, free radical-mediated process, often referred to as selective non-catalytic reduction (SNCR). Suitable nitrogenous compositions for use as the first treatment agent include ammonia such as disclosed by Lyon in U.S. Pat. No. 3,900,554 and urea such as disclosed by Arand et al. in either of U.S. Pat. Nos. 4,208,386 and 4,325,924, the disclosures of each of which are incorporated herein by reference.

Additional appropriate nitrogeneous treatment agents and methods known as being effective for the reduction of nitrogen oxides include those disclosed by International Patent Application entitled "Reduction of Nitrogen-and-Carbon-Based Pollutants Through the Use of Urea Solutions," having publication No. WO 87/02025, filed in the name of Bowers on Oct. 3, 1986; U.S. Pat. No. 4,751,065; U.S. Pat. No. 4,719,092; International Patent Application entitled "Process for the Reduction of Nitrogen Oxides in an Effluent Using a Heterocyclic Hydrocarbon," having Publication No. WO 88/07497, filed in the names of Epperly and Sullivan on Mar. 11, 1988; International Patent Application entitled "Process for the Reduction of Nitrogen Oxides in an Effluent Using Sugar," having publication No. WO 88/07024 filed in the names of Epperly and Sullivan on Mar. 11, 1988; U.S. Pat. No. 4,803,059; International Patent Application entitled "Process for the Reduction of Nitrogen Oxides in an Effluent," having Publication No. WO 89/02870, filed in the names of Epperly, Sullivan and Sprague on Sept. 22, 1988; International Patent Application entitled "Process for the Reduction of Nitrogen Oxides in an Effluent," having Publication No. WO 89/03242, filed in the names of Epperly, Sullivan and Sprague on Oct. 14, 1988; U.S. Pat. No. 4,830,839; U.S. Pat. No. 4,770,863; U.S. Pat. No. 4,863,704; U.S. Pat. No. 4,863,704; the disclosures of each of which are incorporated herein by reference.

These patents and patent applications contemplate the use of treatment agents which comprise urea or ammonia, optionally enhanced by other compositions such as hexamethylenetetramine (HMTA), oxygenated hydrocarbons such as ethylene glycol, ammonium salts of organic acids such as ammonium acetate and ammonium benzoate, heterocyclic hydrocarbons having at least one cyclic oxygen such as furfural, molasses, sugar, 5- or 6-membered heterocyclic hydrocarbons having at least one cyclic nitrogen such as pyridine and pyrolidine, hydroxy amino hydrocarbons such as milk or skimmed milk, amino acids, proteins and monoethanolamine and various other compounds which are disclosed as being effective at reducing nitrogen oxides in an effluent.

As noted, these treatment agents can be introduced according to processes which maximize the nitrogen oxides reductions achieved while minimizing the production of other pollutants. Such processes are described in, for instance, U.S. Pat. No. 4,777,024 and U.S. Pat. No. 4,780,289 as well as International Patent Application entitled "Multi-Stage Process for Reducing the Concentration of Pollutants in an Effluent," having Publication No. WO 89/02780, filed in the names of Epperly, Peter-Hoblyn, Shulof, Jr. and Sullivan on Aug. 12, 1988; and International Patent Application entitled "Process for Nitrogen Oxides Reduction and Minimization of the Production of Other Pollutants," having Publication No. WO 89/02781, filed in the names of Epperly, Sullivan, Sprague and O'Leary on August 12, 1988, the disclosures of each of which are incorporated herein by reference.

When the first treatment agent comprises urea, ammonia or another nitrogenous treatment agent, without a non-nitrogenous hydrocarbon component, it is preferably introduced at an effluent temperature of about 1600° F. to about 2100° F., more preferably about 1700° F. to about 2100° F. When the first treatment agent also comprises one of the enhancers discussed above, it is preferably introduced at an effluent temperature of about 1200° F. to about 1750° F., more preferably about 1350° F. to about 1750° F. or higher. These effluent temperatures at the point of introduction can be varied depending on the particular components of the treatment agent and other effluent conditions, such as the effluent oxygen level, as discussed in the referenced disclosures.

The first treatment agent is introduced into the effluent at a molar ratio of the nitrogen in the treatment agent to the baseline nitrogen oxides level in the effluent of about 1:10 to about 10:1. More preferably, the molar ratio of treatment agent nitrogen to baseline $NO_x$ level is about 1:5 to about 5:1.

The injection parameters for the first treatment agent should also be adjusted so that the after-treatment molar ratio of ammonia to nitrogen oxides in the effluent is about 1:2 to about 10:1. This can be accomplished using the process described in U.S. Pat. No. 4,780,289, which utilizes the nitrogen oxides reduction versus effluent temperature curve of a treatment agent to control the presence of secondary pollutants such as $NH_3$ while reducing $NO_x$.

The specific composition and introduction rate or other equivalent parameters such as the normalized stoichiometric ratio can be adjusted to provide the desired ammonia levels (by normalized stoichiometric ratio is meant the ratio of the concentration of $NO_x$ reducing-radicals such as $NH_x$ radicals [$NH_x$ radicals, with x being an integer, are believed to be the moiety contributed by the treatment agent which facilitates the series of reactions resulting in $NO_x$ breakdown] to the concentration of nitrogen oxides in the effluent and can be expressed as $[NH_x]/[NO_x]$; alternatively, the molar ratio of the treatment agent to the $NO_x$ concentration can be used in place of NSR when the chemistry of reduction is not well defined; the term NSR as used herein will also be understood to encompass molar ratio when appropriate).

It will be recognized that the first and oxygenated treatment agents according to this invention can be combined into a single treatment agent, provided that all of the functions of the individual treatment agents are present in the "combined" treatment agent. The functions, which include $NO_x$ reduction, generation of ammonia and oxidation of NO to $NO_2$, are described above.

By the practice of the present invention, therefore, the elimination of substantial amounts of nitrogen oxides is achieved through both an SNCR process involving the utilization of nitrogenous and oxygenated treatment agents and a scrubbing process utilizing an aqueous scrubbing media. Although both processes are used for the efficient removal of nitrogen oxides from the effluent, the disadvantageous results of the two (the generation and emission to the atmosphere of ammonia and the generation and discharge of nitrites) are avoided by carefully controlling the introduction of the oxygenated treatment agent to provide the appropriate amount of ammonia to be absorbed into the scrubbing media and combine with the nitrites to eliminate both from the discharge water.

The use of the present invention to achieve substantial reductions in the nitrogen oxides concentration of a combustion effluent is illustrated by reference to the following Example.

EXAMPLE

The burner used is a burner having an effluent flue conduit, known as a combustion tunnel, approximately 209 inches in length and having an internal diameter of 8 inches and walls 2 inches thick. The burner has a flame area adjacent the effluent entry port to measure the concentration of compositions such as nitrogen oxides, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are introduced is measured at the point of injection utilizing a K-type thermocouple. Atomizing injectors described in U.S. Pat. No. 4,842,834, the disclosure of which is incorporated herein by reference, are positioned through ports in the effluent flue conduit in order to introduce and distribute the treatment agents into the effluent stream. The burner fuel is a Number 2 fuel oil, and the burner is fired at a rate of 10.2 lbs/hr. to achieve the desired temperature.

For each run, a baseline nitrogen oxides concentration reading is taken (including the $NO_2/NO$ ratio) and then a 10% aqueous solution of urea is introduced at a rate of 300 g/hr at an effluent temperature of 1690° F. as the first treatment agent and a 10% aqueous solution of molasses and ethylene glycol is introduced at a rate of 300 g/hr at an effluent temperature of 1155° F. as the second treatment agent. For a control, a 10% urea solution is injected at 300 g/hr at an effluent temperature of 1690° F. without a second treatment agent and a 10% molasses/ethylene glycol solution is injected at 300 g/hr at an effluent temperature of 1155° F. without a first treatment agent. After each of the runs and the controls, an intermediate nitrogen oxides concentration reading is taken (including the $NO_2/NO$ ratio) in order to calculate the $NO_x$ reduction achieved by the first and second treatment agents. In addition, the percent of NO oxidized to $NO_2$ is also calculated.

The effluent is then contacted with a scrubbing medium in a scrubber, which is a two liter 3 neck flask fitted with a fritted sparge at one neck, a thermometer at another neck and a gas outlet connecter at the third. The scrubbing media used are aqueous solutions which consisting of 1000 parts per million (ppm) of calcium formate (Medium A) or 5% by weight of calcium hydroxide (Medium B). A final nitrogen oxides concentration reading is then taken in order to calculate the overall reduction in nitrogen oxides in the effluent.

The results are set out in Table 1.

TABLE 1

| Run | Intermediate $NO_x$ Reduction (%) | % NO to $NO_2$ | Scrubbing Medium | Overall $NO_x$ Reduction (%) |
| --- | --- | --- | --- | --- |
| 1 | 44.5 | 28.0 | A | 64.6 |
| 2 | 53.0 | 11.7 | B | 64.0 |
| 3 | 39.0 | 26.0 | A | 51.7 |
| 4 | 42.3 | 34.6 | A | 53.8 |
| 5 | 46.1 | 11.5 | A | 59.2 |
| Control 1 | 25.0 | 0.0 | A | 26.0 |
| Control 2 | 11.0 | 44.6 | A | 42.0 |

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims;

We claim:

1. A process for reducing the nitrogen oxide concentration in the effluent from the combustion of a carbonaceous fuel, the process comprising:

a) introducing into the effluent a first treatment agent comprising a nitrogenous composition selected from the group consisting of urea, ammonia, hexamethylenetetramine, ammonium salts of organic acids, 5- or 6-membered heterocyclic hydrocarbons having at least one cyclic nitrogen, hydroxy amino hydrocarbons, $NH_4$-lignosulfonate, furfurylamine, tetrahydrofurylamine, hexamethylenediamine, barbituric acid, guanidine, guanidine carbonate, biguanidine, guanylurea sulfate, melamine, dicyandiamide, biuret, 1,1'-azobisformamide, methylol urea, methylol urea-urea condensation product, dimethylol urea, methyl urea, dimethyl urea, calcium cyanamide, and mixtures thereof under conditions effective to reduce the nitrogen oxides concentration and ensure the presence of ammonia in the effluent;

b) introducing into the effluent a second treatment agent comprising an oxygenated hydrocarbon at an effluent temperature of about 500° F. to about 1600° F. under conditions effective to oxidize nitric oxide in the effluent to nitrogen dioxide and ensure the presence of ammonia at a weight ratio of ammonia to nitrogen dioxide of about 1:5 to about 5:1, and c) contacting the effluent with an aqueous scrubbing solution having a pH of 12 or lower under conditions effective to cause nitrogen dioxide to be absorbed therein.

2. The process of claim 1 wherein said second treatment agent comprises an alcohol, a carbohydrate, a heterocyclic hydrocarbon having at least one cyclic oxygen, or mixtures thereof.

3. The process of claim 2 wherein said second treatment agent comprises an alcohol.

4. The process of claim 3 wherein said alcohol comprises methanol, ethylene glycol or propylene glycol.

5. The process of claim 1 wherein said second treatment agent is introduced at an effluent temperature of about 500° F. to about 1200° F.

6. The process of claim 1 wherein said second treatment agent is introduced at a weight ratio of treatment agent to treated effluent nitrogen oxides level of about 1:5 to about 5:1.

7. The process of claim 6, wherein said second treatment agent is introduced at a weight ratio of ammonia in the effluent to nitrogen dioxide is about 1:2 to about 2:1.

8. The process of claim 1 wherein said scrubbing solution comprises a composition selected from the group consisting of sulfuric acid, ammonium sulfate, sodium citrate, sodium carbonate or calcium acetate.

9. The process of claim 8 wherein said composition is present in said aqueous absorbing solution in an amount of about 500 ppm to about 1500 ppm.

10. The process of claim 1 wherein said scrubbing solution is at a temperature of about 50° F. to about 300° F.

11. The process of claim 1 wherein said first treatment agent is introduced at an effluent temperature of about 1700° F. to about 2100° F.

12. The process of claim 1 wherein said first treatment agent further comprises an enhancer selected from the group consisting of an oxygenated hydrocarbon, a heterocyclic hydrocarbon having at least one cyclic oxygen, sugar, molasses, and mixtures thereof.

13. The process of claim 12 wherein said first treatment agent is introduced at an effluent temperature of about 1350° F. to about 1750° F.

14. The process of claim 1 wherein said first treatment agent is introduced at a molar ratio of treatment agent nitrogen to effluent baseline nitrogen oxides level of about 1:10 to about 10:1.

15. The process of claim 14 wherein said first treatment agent is introduced at molar ratio and a temperature wherein the molar ratio of ammonia in the treated effluent to nitrogen oxides in the treated effluent is about 1:2 to about 10:1.

* * * * *

UNITED STATES PATENT AND TRADEMARK OFFICE
CERTIFICATE OF CORRECTION

PATENT NO. : 5,047,219

DATED : September 10, 1991

INVENTOR(S) : W. Robert Epperly and Barry N. Sprague

It is certified that error appears in the above—identified patent and that said Letters Patent is hereby corrected as shown below:

At column 5, line 43, "PCT/US89/0711" should read --PCT/US89/01711--.

At column 5, line 50, "4,837,066" should read --4,873,066--.

At column 7, line 18, first occurrence, "4,863,704" should read --4,902,488--.

Signed and Sealed this

Twenty-ninth Day of December, 1992

Attest:

DOUGLAS B. COMER

Attesting Officer        Acting Commissioner of Patents and Trademarks